(12) United States Patent
Yokota et al.

(10) Patent No.: US 11,405,421 B2
(45) Date of Patent: Aug. 2, 2022

(54) ELECTRONIC CONTROL APPARATUS, MONITORING METHOD, RECORDING MEDIUM, AND GATEWAY APPARATUS

(71) Applicant: PANASONIC INTELLECTUAL PROPERTY MANAGEMENT CO., LTD., Osaka (JP)

(72) Inventors: Kaoru Yokota, Hyogo (JP); Toshihisa Nakano, Osaka (JP); Jun Anzai, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 713 days.

(21) Appl. No.: 16/436,385

(22) Filed: Jun. 10, 2019

(65) Prior Publication Data

US 2019/0387023 A1    Dec. 19, 2019

(30) Foreign Application Priority Data

Jun. 15, 2018  (JP) .............................. JP2018-114969

(51) Int. Cl.
*H04L 9/40* (2022.01)
*H04L 12/40* (2006.01)

(52) U.S. Cl.
CPC ...... *H04L 63/1483* (2013.01); *H04L 63/1425* (2013.01); *H04L 12/40* (2013.01); *H04L 2012/40273* (2013.01)

(58) Field of Classification Search
CPC .................................................. H04L 63/1483
See application file for complete search history.

(56) References Cited

U.S. PATENT DOCUMENTS

| | | | | |
|---|---|---|---|---|
| 9,843,594 B1* | 12/2017 | Evans | ................. | H04L 63/1425 |
| 10,091,077 B1* | 10/2018 | Pukish | ................. | H04L 63/1425 |
| 10,326,788 B1* | 6/2019 | Bajpai | ................. | H04L 63/1416 |
| 11,044,260 B2* | 6/2021 | Shin | ...................... | H04W 12/61 |
| 2006/0115085 A1* | 6/2006 | Iwamura | ............... | H04L 9/0891 380/259 |
| 2015/0020152 A1* | 1/2015 | Litichever | ........... | H04L 63/0263 726/1 |
| 2015/0113638 A1* | 4/2015 | Valasek | ................. | G06F 21/562 726/22 |

(Continued)

FOREIGN PATENT DOCUMENTS

| | | |
|---|---|---|
| JP | 2007-312193 | 11/2007 |
| JP | 2016-129314 | 7/2016 |
| JP | 2017-084296 | 5/2017 |

OTHER PUBLICATIONS

Office Action dated May 21, 2019 issued in Japanese Patent Appl. No. 2018-114969.

*Primary Examiner* — Khang Do

(74) *Attorney, Agent, or Firm* — Greenblum & Bernstein, P.L.C.

(57) ABSTRACT

An electronic control apparatus includes: an obtaining unit configured to obtain data transmitted via a network in a system; and a judging unit configured to judge presence or absence of an anomaly in the data obtained by the obtaining unit, based on a transmission state of the data. The judging unit is configured to judge that an anomaly is present in the data, when the transmission state of the data is a transmission stopped state.

14 Claims, 12 Drawing Sheets

(56) References Cited

U.S. PATENT DOCUMENTS

| | | | |
|---|---|---|---|
| 2015/0195297 A1* | 7/2015 | Ben Noon | G06F 21/6281 |
| | | | 726/22 |
| 2015/0358351 A1* | 12/2015 | Otsuka | H04L 12/4625 |
| | | | 726/23 |
| 2016/0188396 A1* | 6/2016 | Sonalker | G06F 11/079 |
| | | | 714/37 |
| 2016/0308887 A1* | 10/2016 | Jung | H04L 63/1416 |
| 2016/0359893 A1* | 12/2016 | Kishikawa | H04L 63/1425 |
| 2016/0373449 A1* | 12/2016 | Haga | B60R 16/023 |
| 2017/0013005 A1* | 1/2017 | Galula | H04L 63/1425 |
| 2017/0078884 A1* | 3/2017 | Tanabe | B60R 16/023 |
| 2018/0131712 A1* | 5/2018 | Cornelio | H04L 63/1416 |
| 2018/0196941 A1* | 7/2018 | Ruvio | H04L 63/0227 |
| 2018/0248766 A1* | 8/2018 | Ezra | H04L 63/1416 |
| 2018/0300477 A1* | 10/2018 | Galula | H04L 63/1416 |
| 2018/0302422 A1* | 10/2018 | Kishikawa | H04L 9/3271 |
| 2018/0316584 A1* | 11/2018 | Ujiie | H04W 12/61 |
| 2018/0375879 A1* | 12/2018 | Carlesimo | H04L 63/1425 |
| 2019/0028500 A1* | 1/2019 | Lee | H04L 12/40032 |
| 2019/0222599 A1* | 7/2019 | Inoue | H04L 12/40032 |
| 2019/0356608 A1* | 11/2019 | Tanaka | H04B 7/15528 |
| 2019/0384771 A1* | 12/2019 | Kurita | G06F 16/254 |
| 2019/0385057 A1* | 12/2019 | Litichever | H04L 63/14 |

* cited by examiner

FIG. 3

| Data ID | Transmission state | Transmission source information processor ID |
|---|---|---|
| 0×013 | Transmission execution state | 001 |
| 0×103 | Transmission execution state | |
| 0×045 | Transmission execution state | |
| 0×032 | Transmission stopped state | 002 |
| 0×004 | Transmission execution state | 003 |
| 0×005 | Transmission execution state | |
| ⋮ | ⋮ | ⋮ |

FIG. 4

| Data ID | Transmission state |
|---|---|
| 0×013 | Transmission execution state |
| 0×103 | Transmission execution state |
| 0×045 | Transmission execution state |
| 0×032 | Transmission stopped state |
| 0×004 | Transmission execution state |
| 0×005 | Transmission execution state |
| ⋮ | ⋮ |

FIG. 5A

| Data ID | Transmission source information processor ID |
|---|---|
| 0×013 | |
| 0×103 | 001 |
| 0×045 | |
| 0×032 | 002 |
| 0×004 | 003 |
| 0×005 | |
| ⋮ | ⋮ |

FIG. 5B

| Data ID | Transmission state |
|---|---|
| 0×013 | Transmission execution state |
| 0×103 | Transmission execution state |
| 0×045 | Transmission execution state |
| 0×032 | Transmission stopped state |
| 0×004 | Transmission execution state |
| 0×005 | Transmission execution state |
| ⋮ | ⋮ |

FIG. 6

| Data ID | Transmission state | Transmission source information processor ID |
|---|---|---|
| 0×013 | Transmission stopped state | 001 |
| 0×103 | Transmission stopped state | |
| 0×045 | Transmission stopped state | |
| 0×032 | Transmission stopped state | 002 |
| 0×004 | Transmission execution state | 003 |
| 0×005 | Transmission execution state | |
| ⋮ | ⋮ | ⋮ |

FIG. 9

| Data ID | Transmission state |
|---|---|
| 0×013 | Transmission execution state |
| 0×103 | Transmission execution state |
| 0×045 | Transmission execution state |
| 0×032 | Transmission stopped state |
| 0×004 | Transmission execution state |
| 0×005 | Transmission execution state |
| ⋮ | ⋮ |

ELECTRONIC CONTROL APPARATUS, MONITORING METHOD, RECORDING MEDIUM, AND GATEWAY APPARATUS

CROSS REFERENCE TO RELATED APPLICATION

The present application is based on and claims priority of Japanese Patent Application No. 2018-114969 filed on Jun. 15, 2018. The entire disclosure of the above-identified application, including the specification, drawings and claims is incorporated herein by reference in its entirety.

FIELD

The present disclosure relates to an electronic control apparatus, a monitoring method, a recording medium, and a gateway apparatus.

BACKGROUND

A monitoring apparatus that monitors the network in mobility, such as an automobile, etc, has been studied. For example, Patent Literature 1 discloses the technique of determining fraud in an electronic control unit communicatively coupled to a bus in-vehicle network. In the technique of Patent Literature 1, when a message to an electronic control unit is an anomalous message transmitted in a different transmission cycle from a predetermined transmission cycle, the technique causes the electronic control unit which is supposed to be the transmission source of the message to stop transmitting the message. Furthermore, in the technique of Patent Literature 1, when an anomalous message is received even when the electronic control unit that is the transmission source of the message is in the stopped state, it is determined that an electronic control unit that spoofs any one of electronic control units is present.

CITATION LIST

Patent Literature

Patent Literature 1
  Japanese Unexamined Patent Application Publication No. 2016-129314

SUMMARY

Technical Problem

In Patent Literature 1, an anomaly in a message is judged based on an anomaly in the transmission cycle of the message. However, there may be a case where the spoofing electronic unit transmits an anomalous message of which the transmission period is normal. Therefore, the technique of Patent Literature 1 may not be enough for monitoring an anomaly in data such as messages.

The present disclosure provides an electronic control apparatus, a monitoring method, a recording medium, and a gateway apparatus that improve the accuracy of detecting an anomaly in data in a network.

Solution to Problem

An electronic control apparatus according to an exemplary and non limiting aspect of the present disclosure includes: an obtaining unit configured to obtain data transmitted via a network in a system; and a judging unit configured to judge presence or absence of an anomaly in the data obtained by the obtaining unit, based on a transmission state of the data. The judging unit is configured to judge that an anomaly is present in the data, when the transmission state of the data is a transmission stopped state.

A monitoring method according to an exemplary and non limiting aspect of the present disclosure includes: obtaining data transmitted via a network in a system; and judging that an anomaly is present in the data obtained, when a transmission state of the data is a transmission stopped state.

A non-transitory computer-readable recording medium for use in a computer according to an exemplary and non limiting aspect of the present disclosure is a non-transitory computer-readable recording medium for use in a computer, the non-transitory computer-readable recording medium having a computer program recorded thereon for causing the computer to execute: obtaining data transmitted via a network in a system; and judging that an anomaly is present in the data obtained, when a transmission state of the data is a transmission stopped state.

A gateway apparatus according to an exemplary and non limiting aspect of the present disclosure includes: an obtaining unit configured to obtain data transmitted via a network in a system; a judging unit configured to judge that an anomaly is present in the data obtained by the obtaining unit, when a transmission state of the data is a transmission stopped state; and a transfer unit configured to stop transferring the data, when the judging unit judges that the anomaly is present in the data.

These general and specific aspects may be implemented using a system, an apparatus, a method, an integrated circuit, a computer program, or a computer-readable recording medium such as a recording disk, or any combination of systems, apparatuses, methods, integrated circuits, computer programs, or computer-readable recording media. The computer-readable recording medium includes, for example, a non-volatile recording medium such as a compact disc-read only memory (CD-ROM).

Advantageous Effects

The technique according to the present disclosure makes it possible to improve the accuracy of detecting an anomaly in data in a network.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3 is a table illustrating an example of relationships between data IDs and transmission states according to Embodiment 1.

FIG. 4 is a table illustrating another example of the relationships between data IDs and transmission states according to Embodiment 1.

FIG. 5A is a table illustrating still another example of the relationships between data IDs and transmission states according to Embodiment 1.

FIG. 5B is a table illustrating yet another example of the relationships between data IDs and transmission states according to Embodiment 1.

FIG. 6 is a table illustrating an example of the relationships between data IDs and transmission states in which some of the transmission states have been changed from the transmission states in FIG. 3.

FIG. 9 is a table illustrating an example of relationships between data IDs and transmission states according to Embodiment 2.

DESCRIPTION OF EMBODIMENTS

Figure 1:
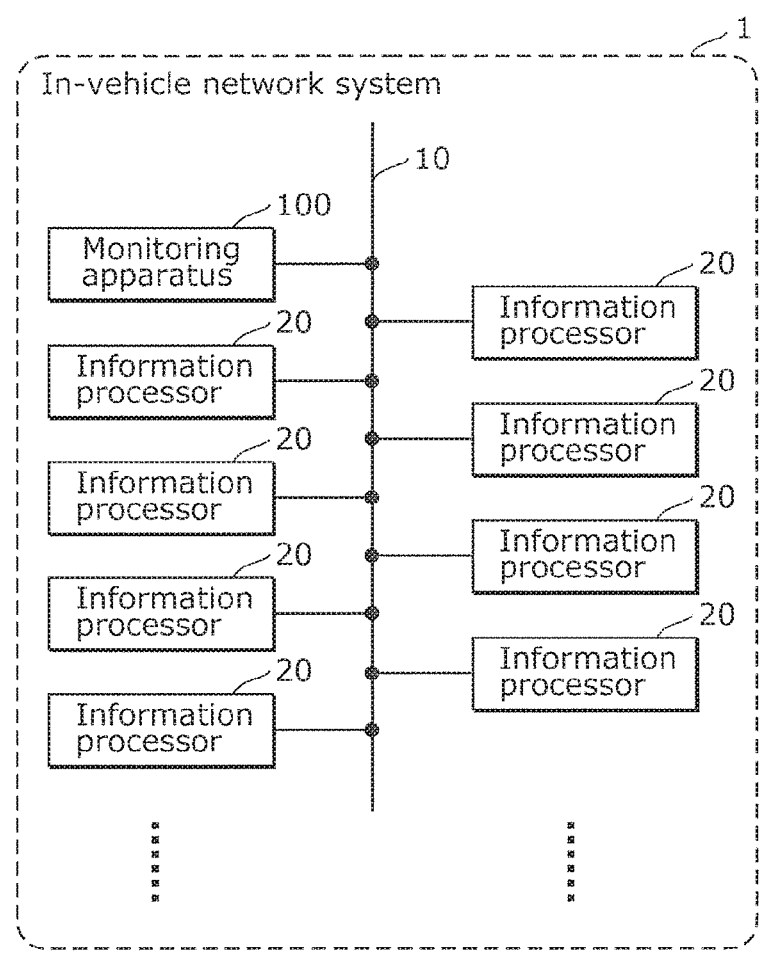
FIG. 1 is a block diagram illustrating an example of a functional configuration of an in-vehicle network system including a monitoring apparatus according to Embodiment 1.

The inventors of the present disclosure have examined a technique of monitoring a network in mobility, such as an automobile. The mobility is also called a moving object and includes various movable devices. The mobility may be a moving object capable of carrying people, may be a moving object capable of carrying articles, or may be a moving object that carries neither people nor articles. Examples of the mobility include a vehicle, a flying object, a ship, and a robot. Examples of the vehicle include an automobile, a track, a bus, a two-wheeled vehicle, a tracked or trackless train, a conveyance vehicle, and an industrial vehicle such as a construction machine and a cargo handling machine. Examples of a flying object include an airplane, an airship, and a drone.

An information processor (also called a "signal processor") which is an apparatus communicatively coupled to the network in mobility may receive an attack from outside of the network, and its function may be changed. In view of the above, the inventors of the present disclosure have examined a technique of monitoring the network by detecting anomalous data outputted from an information processor that has received such an attack.

There are various cases of attacks. A first case is a case where an intruder entering the network spoofs an authorized information processor and transmits camouflage data, while the authorized information processor continues to periodically transmit normal data to the network. In this case, the normal data and the camouflage data of the information processor coexist in the network under attack. In the present specification, the attack in the first case is called a "camouflage data attack while authorized data coexists".

A second case is a case where an intruder entering the network transmits a camouflage diagnostic command to an authorized information processor, stops the authorized information processor, and transmits camouflage data instead of normal data. A third case is a case where an intruder entering the network forges a firmware of an authorized information processor such that it transmits camouflage data instead of normal data. A fourth case is a case where an intruder entering the network forges a routing program of a relay apparatus, such as a gateway, that relays the network, stops the relay, and transmits camouflage relay data instead of normal relay data. In the second through fourth cases, the transmission of the normal data by the authorized information processor is suppressed, and only the camouflage data are present in the network under attack. In the present specification, the attacks in the second through fourth cases are each called a "camouflage data attack while authorized data is suppressed".

In the camouflage data attack while authorized data coexists, since the normal data and the camouflage data of the authorized information processor coexist, the output cycle of the data differs from a proper cycle during the attack. In the camouflage data attack while authorized data is suppressed, camouflage data is present as a replacement for the normal data of an authorized information processor. Thus, the output cycle of the data sometimes does not differ from the proper cycle even during the attack. Although the technique of Patent Literature 1 can detect an anomaly in the data under the camouflage data attack while authorized data coexists, Patent Literature 1 cannot detect an anomaly in data under the camouflage data attack while authorized data is suppressed. Thus, the technique of Patent Literature 1 cannot sufficiently monitor anomalies in data. In view of the above, the inventors of the present disclosure have examined a technique that makes it possible to detect an anomaly in data due to the camouflage data attack while authorized data is suppressed, and have conceived the following technique.

For example, an electronic control apparatus according to one aspect of the present disclosure includes: an obtaining unit configured to obtain data transmitted via a network in a system; and a judging unit configured to judge presence or absence of an anomaly in the data obtained by the obtaining unit, based on a transmission state of the data. The judging unit is configured to judge that an anomaly is present in the data, when the transmission state of the data is a transmission stopped state.

According to the above aspect, the electronic control apparatus judges that an anomaly is present in data when the data whose transmission state is the transmission stopped state is obtained. Such an electronic control apparatus can detect an anomaly in data, not only when the data is forged with change in the output cycle, but also when the data is forged without change in the output cycle. Thus, such an electronic control apparatus makes it possible to improve the detection accuracy of an anomaly in data in the network.

The electronic control apparatus according to one aspect of the present disclosure may further includes: a determination unit configured to determine, based on the data obtained by the obtaining unit, the transmission state of the data.

In the electronic control apparatus according to one aspect of the present disclosure, the determination unit may determine, based on first data obtained by the obtaining unit, a transmission state of second data whose transmission source is an information processor that is a destination of the first data, and the judging unit may judge that an anomaly is present in the second data, when the transmission state of the second data obtained by the obtaining unit is the transmission stopped state.

According to the above aspect, the electronic control apparatus determines the transmission state of the data transmitted from the information processor, based on the first data transmitted to the information processor. The electronic control apparatus manages the transmission state of data for each information processor. Thus, the electronic control apparatus enables highly accurate and simple detection of an anomaly in data in the network.

In the electronic control apparatus according to one aspect of the present disclosure, the first data includes an instruction instructing the information processor to execute or stop transmission of data, and the determination unit may determine that the transmission state of the second data is a transmission execution state or the transmission stopped state in accordance with the instruction included in the first data.

According to the above aspect, the electronic control apparatus determines the transmission state of the data transmitted from the information processor in accordance with the instruction included in the first data. Thus, the process of determining a transmission state can be simplified.

In the electronic control apparatus according to one aspect of the present disclosure, when third data cyclically outputted by an information processor communicatively coupled to the network is not obtained for a predetermined period, the determination unit may determine that a transmission state of the third data is the transmission stopped state; and when the transmission state of the third data obtained by the obtaining unit is the transmission stopped state, the judging unit may judge that an anomaly is present in the third data.

According to the above aspect, when the third data is not obtained by the obtaining unit for a predetermined period, the third data can be considered as being in the transmission stopped state. The electronic control apparatus judges that an anomaly is present in the third data, when such third data whose transmission state is the transmission stopped state is obtained. The electronic control apparatus can detect an anomaly in data, not only when the data is forged with change in the output cycle, but also when the data is forged without change in the output cycle.

In the electronic control apparatus according to one aspect of the present disclosure, when third data cyclically outputted by an information processor communicatively coupled to the network is not obtained for a predetermined period, the determination unit may determine that a transmission state of fourth data is the transmission stopped state, the fourth data being different from the third data whose transmission source is the information processor, and when the transmission state of the fourth data obtained by the obtaining unit is the transmission stopped state, the judging unit may judge that an anomaly is present in the fourth data.

According to the above aspect, the electronic control apparatus determines, based on the third data that is transmittable from the information processor, the transmission state of another data that is possibly outputted by the information processor. The electronic control apparatus manages the transmission state of data for each information processor. Thus, the electronic control apparatus enables highly accurate and simple detection of an anomaly in data in the network.

In the electronic control apparatus according to one aspect of the present disclosure, the determination unit may determine that the transmission state of the fourth data is a transmission execution state or the transmission stopped state in accordance with an instruction included in fifth data whose destination is the information processor, the fifth data includes the instruction instructing the information processor to execute or stop transmission of data, and when the transmission state of the fourth data obtained by the obtaining unit is the transmission stopped state, the judging unit may judge that an anomaly is present in the fourth data.

According to the above aspect, the electronic control apparatus determines that data is in the transmission stopped state in both cases where the data is not obtained for a predetermined period and where the data including an instruction for stopping transmission is obtained. The electronic control apparatus then judges presence or absence of an anomaly in the data obtained by the obtaining unit based on the transmission stopped state determined in the above manner. Thus, the electronic control apparatus makes it possible to improve the accuracy of detecting an anomaly in data.

The electronic control apparatus according to one aspect of the present disclosure further includes: a storage unit configured to store, in association with one another, i) an information processor communicatively coupled to the network, ii) data whose transmission source is the information processor, and iii) the transmission state of the data whose transmission source is the information processor. The judging unit may change the transmission state stored in the storage unit using the transmission state determined by the determination unit, and the judging unit is configured to perform judgment based on the transmission state stored in the storage unit.

According to the above aspect, the transmission state of data is held in the storage unit. Since the judging unit performs the judgment using the transmission state held in the storage unit, the processing of the judging unit can be simplified.

The electronic control apparatus according to one aspect of the present disclosure further includes: a storage unit that stores, in association with one another, i) the data transmitted between a plurality of information processors communicatively coupled to the network and ii) the transmission state of the data. The determination unit may change the transmission state stored in the storage unit using the transmission state determined by the judging unit, and the judging unit may perform judgment based on the transmission state stored in the storage unit.

According to the above aspect, the transmission state of data is held in the storage unit. Since the judging unit performs the judgment using the transmission state held in the storage unit, the processing of the judging unit can be simplified.

In the electronic control apparatus according to one aspect of the present disclosure, when a power supply of an information processor communicatively coupled to the network is in an ON state, the judging unit may judge that data whose transmission source is the information processor is in a transmission execution state, and when the power supply of the information processor is in an OFF state, the judging unit may judge that the data whose transmission source is the information processor is in the transmission stopped state.

According to the above aspect, the number of cases where the transmission state is determined to be the transmission stopped state increases, and thus the electronic control apparatus can improve the detection accuracy of an anomaly in data.

In the electronic control apparatus according to one aspect of the present disclosure, when a state of an information processor is a diagnostic mode or a program updating mode, the determination unit may determine that data whose transmission source is the information processor is in the transmission stopped state.

In the electronic control apparatus according to one aspect of the present disclosure, the network is a bus network including a plurality of buses, the electronic control apparatus is provided for a plurality of buses, and the obtaining unit of the electronic control apparatus may obtain data from the plurality of buses.

According to the above aspect, the number of electronic control apparatuses can be reduced, and thus the cost can also be reduced.

In the electronic control apparatus according to one aspect of the present disclosure, the network is a bus network including a plurality of buses, a plurality of electronic control apparatuses are provided for the plurality of buses, the plurality of electronic control apparatuses each being the electronic control apparatus, and the obtaining unit in each of the plurality of the electronic control apparatuses may obtain data from each of the plurality of buses.

In the above aspect, for example, when the plurality of buses are communicatively coupled to one another via a relay apparatus such as a gateway, providing the electronic control apparatus for each bus enables the electronic control apparatus to monitor the bus while interference with processing of the relay apparatus is suppressed. In other words, this allows reliable monitoring of each bus.

A monitoring method according to one aspect of the present disclosure is a monitoring method performed by an electronic control apparatus, the monitoring method including: obtaining data transmitted via a network in a system; and judging that an anomaly is present in the data obtained, when a transmission state of the data is a transmission stopped state. According to the above aspect, effects similar to the effects obtained with the electronic control apparatus according to one aspect of the present disclosure can be obtained.

A recording medium according to one aspect of the present disclosure is a non-transitory computer-readable recording medium for use in a computer, the non-transitory computer-readable recording medium having a computer program recorded thereon for causing the computer to execute: obtaining data transmitted via a network in a system; and judging that an anomaly is present in the data obtained, when a transmission state of the data is a transmission stopped state. According to the above aspect, effects similar to the effects obtained with the electronic control apparatus according to one aspect of the present disclosure can be obtained.

A gateway apparatus according to one aspect of the present disclosure includes: an obtaining unit configured to obtain data transmitted via a network in a system; a judging unit configured to judge that an anomaly is present in the data obtained by the obtaining unit, when a transmission state of the data is a transmission stopped state; and a transfer unit configured to stop transferring the data, when the judging unit judges that the anomaly is present in the data.

It should be noted that these general and specific aspects may be implemented using a system, an apparatus, a method, an integrated circuit, a computer program, or a computer-readable recording medium such as a recording disk, or, any combination of systems, apparatuses, methods, integrated circuits, computer programs, or computer-readable recording media. The computer-readable recording medium includes, for example, a non-volatile recording medium such as a compact disc-read only memory (CD-ROM). In addition, the apparatus may comprise one or more apparatuses. When the apparatus comprises two or more apparatuses, the two or more apparatuses may be disposed in a single device, or may be individually disposed in two or more separate devices. In the Specification and Claims, "apparatus" means not only a single apparatus, but also a system including a plurality of apparatuses.

Hereinafter, the electronic control apparatus, etc. according to the present disclosure are described in detail with reference to the drawings. Each of the embodiments described below shows a general or specific example. The numerical values, shapes, structural components, the arrangement and connection of the structural components, steps (processes), the processing order of the steps, etc. shown in the following embodiments are mere examples, and therefore do not limit the scope of the claims of present disclosure. Therefore, among the structural components in the following embodiments, structural components not recited in any one of the independent claims are described as arbitrary structural components. In addition, each diagram is a schematic diagram and not necessarily illustrated precisely. In each of the diagrams, substantially the same structural components are assigned with the same reference signs, and redundant descriptions will be omitted or simplified.

Embodiment 1

The following describes a monitoring apparatus 100 according to Embodiment 1. In the following embodiments, the monitoring apparatus 100 is described as one example of the electronic control apparatus, and an apparatus that monitors data in the network in a vehicle. It should be noted that the subject to be monitored by the monitoring apparatus 100 is not limited to an in-vehicle network, and may be a network included in any device.

[1-1. Configuration of Monitoring Apparatus]

The following describes configurations of the monitoring apparatus 100 according to Embodiment 1 and surrounding components. FIG. 1 is a block diagram illustrating an example of a functional configuration of an in-vehicle network system 1 including a monitoring apparatus 100 according to Embodiment 1. The in-vehicle network system 1 includes: a network 10, a plurality of information processors 20 communicatively coupled to the network 10, and the monitoring apparatus 100 communicatively coupled to the network 10.

Each of the information processors 20 controls an operation of a corresponding one of the devices in a vehicle, which are not illustrated. An example of each information processor 20 is an electronic control unit (ECU). Examples of the devices controlled by the information processors 20 include a driving apparatus in a vehicle, an accessory apparatus of the vehicle, and an external interface included in the vehicle. Examples of the driving apparatus include, but not limited to, an ignition apparatus, various meters, a transmission, antilock brake system (ABS), an engine, a parking assistance apparatus. Examples of the accessory apparatus include, but not limited to, an electronic mirror, an air conditioner, an in-vehicle camera, a door locking apparatus, a power window. Examples of the external interface include, but not limited to, a head unit that includes a display such as a touch panel and receives an input from a user, an on-board diagnostics (OBD) unit that outputs a result of self-diagnosis of the vehicle, a communication module, a navigation system.

The information processors 20 and the monitoring apparatus 100 are communicatively coupled to the network 10. The network 10 communicatively couples the information processors 20 to one another, and further communicatively couples the information processors 20 to the monitoring apparatus 100. In the present embodiment, the network 10 does not communicatively couple, on a one-to-one basis, two apparatuses, for example, the information processors 20 and the monitoring apparatus 100, etc. The network 10 in the present embodiment is a bus network in which a signal output to the network 10 is received by all the apparatuses communicatively coupled to the network 10. For example, in FIG. 1, when one of the information processors 20 transmits a signal to the network 10, all the other information processors 20 and the monitoring apparatus 100 in the network 10 can receive the signal. One example of the network 10 is a controller area network (CAN). According to the present embodiment, in the bus network 10, each information processor 20 outputs a signal to the network 10 in a predetermined cycle. One example of the cycle is 20 milliseconds (ms).

The signal, i.e., data, outputted from each information processor 20 to the network 10 is also called a message. The data includes an ID, namely, identification information (hereafter, also called a "data ID"), and a payload including instruction content. The destination of data is set in the data ID in advance. Each information processor 20 checks the data ID of the obtained data to confirm the obtained data is addressed to the information processor 20 itself, and executes an instruction included in the payload.

The monitoring apparatus 100 monitors, specifically, continuously monitors, data output from each information processor 20 to the network 10. The monitoring apparatus 100 determines whether data transmitted through the network 10 is normal data or anomalous data. The anomalous data is data outputted from an information processor 20 that no longer functions normally due to an attack received from outside of the in-vehicle network system 1, or data outputted from an information processor, etc. that spoofs another information processor 20. The normal data is data outputted from an information processor 20 that has not been attacked from outside and can function normally.

Figure 2:
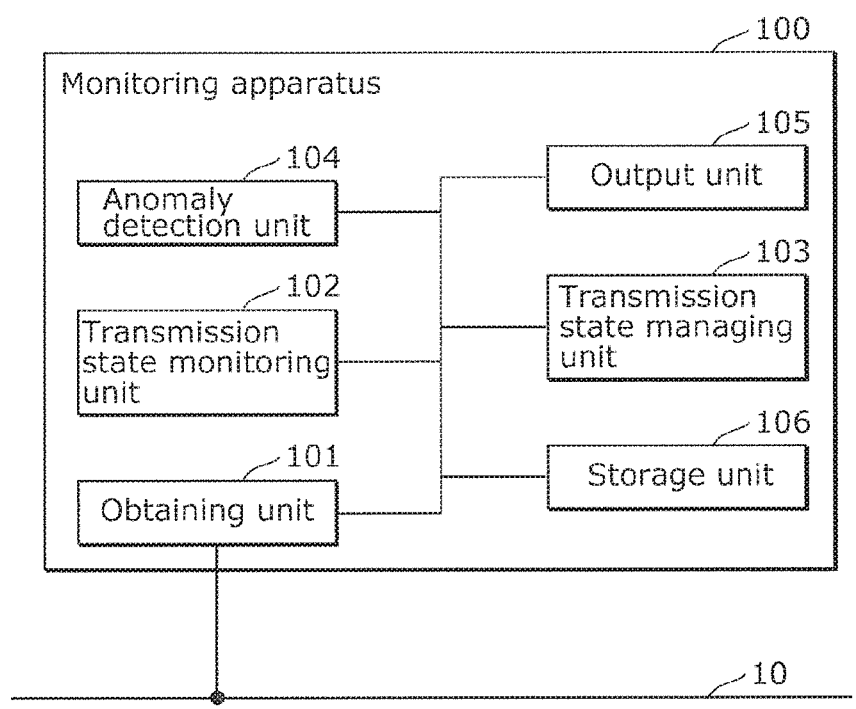
FIG. 2 is a block diagram illustrating an example of functional configuration of the monitoring apparatus according to Embodiment 1.

FIG. 2 is a block diagram illustrating an example of the functional configuration of the monitoring apparatus 100 according to Embodiment 1. As illustrated in FIG. 2, the monitoring apparatus 100 includes an obtaining unit 101, a transmission state monitoring unit 102, a transmission state managing unit 103, an anomaly detection unit 104, an output unit 105, and a storage unit 106.

The storage unit 106 enables storage and extraction of various kinds of information. The storage unit 106 is implemented by, for example, a semiconductor memory such as a read only memory (ROM), a random access memory (RAM), and a flash memory, or a storage apparatus such as a hard disk drive and a solid state drive (SSD), for example. The storage unit 106 stores information about the data outputted from each of the information processors 20. Furthermore, the storage unit 106 may store a program for operating each structural component in the monitoring apparatus 100.

The obtaining unit 101 obtains, from the network 10, data outputted from each information processor 20 to the network 10, and outputs the data to the transmission state monitoring unit 102 and the anomaly detection unit 104. The obtaining unit 101 obtains data outputted from all the information processors 20 to the network 10.

The transmission state monitoring unit 102 determines a transmission state of the data, i.e., a transmission state associated with the data ID of the data, based on the data obtained by the obtaining unit 101. The transmission states to be determined include a transmission execution state in which data is transmitted to the network 10, and a transmission stopped state in which transmission of data to the network 10 is stopped. The transmission state monitoring unit 102 outputs, to the transmission state managing unit 103, the determined transmission state and a data ID subjected to the determined transmission state.

In the present embodiment, the transmission state monitoring unit 102 determines the transmission state of each information processor 20, based on data (hereafter also called "instruction data") including an instruction instructing the information processor 20 to execute or stop transmission of data. The destination of the instruction data is the above information processor 20 whose transmission state is to be determined. The transmission state monitoring unit 102 determines the transmission state of the information processor 20 that is the destination of the instruction data in accordance with the instruction content included in the instruction data. Once the transmission state of the information processor 20 is determined, this enables determination of the transmission state of the data whose transmission source is the information processor 20. One example of the instruction data is diagnostic data, and is also called a diagnostic message. Examples of the instruction content of the diagnostic data include an instruction instructing the destination information processor 20 to change its operation mode to a self diagnostic mode or return from the diagnostic mode to a normal mode, or an instruction instructing the destination information processor 20 to change its operation mode to a reprogramming mode for changing a program or return from the reprogramming mode to the normal mode. The information processor 20 stops outputting data, i.e., transmitting data during the diagnostic mode and the reprogramming mode, and the information processor 20 restarts transmitting data after the diagnostic mode and the reprogramming mode is returned to the normal mode. The transmission state monitoring unit 102 outputs, to the transmission state managing unit 103, a transmission state determined based on the instruction content of the instruction data, and a data ID of the instruction data.

The transmission state managing unit 103 manages the transmission state of data for each data ID. Based on the transmission state of the data transmitted from the transmission state monitoring unit 102, the transmission state managing unit 103 changes, i.e., updates, the transmission state of the data stored in the storage unit 106. When the transmission state stored in the storage unit 106 is different from the transmission state transmitted from the transmission state monitoring unit 102, the transmission state managing unit 103 changes the transmission state in the storage unit 106 to the transmission state transmitted from the transmission state monitoring unit 102. Here, the transmission state monitoring unit 102 and the transmission state managing unit 103 are examples of a determination unit.

In the present embodiment, as shown in FIG. 3, the storage unit 106 stores, in association with one another, i) each data ID and ii) a transmission state of data having the data ID. FIG. 3 is a table showing an example of the relationships between data IDs and transmission states according to Embodiment 1. FIG. 3 shows data IDs that are associated with IDs of information processors 20 that are the transmission sources of the data having the data IDs. As shown in FIG. 3, the storage unit 106 may store, in association with one another, i) each data ID, ii) an ID of the information processor 20 that is the transmission source of the data, and iii) the transmission state of the data having the data ID. However, the data IDs and the information processors 20 that are the transmission sources of the data having the data IDs are associated with one another in advance, for example, when the data IDs are set. Therefore, by checking a data ID, it is possible to specify an information processor 20 that is the transmission source of the data having the data ID. Thus, as shown in FIG. 4, data IDs may be associated with only the transmission states of the data having the data IDs, and stored in the storage unit 106. Note that FIG. 4 is a table showing another example of the relationships between the data IDs and the transmission states according to Embodiment 1.

As shown in FIG. 5A and FIG. 5B, the relationships shown in FIG. 3 may be divided into two tables and stored in the storage unit 106. FIG. 5A and FIG. 5B illustrates another example of the relationships between the data IDs and the transmission states according to Embodiment 1. Specifically, as shown in FIG. 5A, the storage unit 106 stores, in association with one another, i) data IDs and ii) IDs of the information processors 20 that are the transmission sources of the data having the above data IDs. Furthermore, as illustrated in FIG. 5B, the storage unit 106 stores, in association with one another, i) the data IDs and ii) the transmission states associated with the data IDs. In this case, the transmission state managing unit 103 manages the transmission state of each of the data IDs by referring to relationships in two tables, such as the tables shown in FIG. 5A and FIG. 5B.

When the transmission state managing unit 103 obtains a transmission state and a data ID of an instruction data from the transmission state monitoring unit 102, all the data IDs of the data whose transmission source is the information processor 20 that is the destination of the instruction data having the data IDs are specified, and the transmission states associated with the specified data IDs are changed to the obtained transmission state. For example, when the destination associated with a data ID of the instruction data is the information processor 20 having the ID "001" in FIG. 3, and the obtained transmission state is the transmission stopped state, the transmission state managing unit 103 changes, as shown in FIG. 6, from the transmission execution states to the transmission stopped states, all the transmission states associated with the data IDs "0x013", "0x103", and "0x045" whose transmission source is the information processor 20 having the ID "001". Note that FIG. 6 is a table illustrating an example of relationships between transmission states and data IDs, in which some of the transmission states are changed from the transmission states shown in FIG. 3.

Furthermore, when transmission state managing unit 103 obtains an inquiry about the transmission state associated with a data ID from the anomaly detection unit 104, the transmission state managing unit 103 obtains the transmission state associated with the data ID and outputs the transmission state to the anomaly detection unit 104 by referring to the storage unit 106.

The anomaly detection unit 104 inquires of the managing unit 103 about the transmission state associated with a data ID of each data obtained from the obtaining unit 101. The anomaly detection unit 104 determines presence or absence of an anomaly in the data having the data ID based on the obtained transmission state. Specifically, the anomaly detection unit 104 judges that an anomaly is present in data having the data ID, when the transmission state of the obtained data ID is a transmission stopped state. The anomaly detection unit 104 judges that the data is normal, when the transmission state of the obtained data ID is a transmission execution state. The anomaly detection unit 104 outputs the judgment result to the output unit 105. In the present embodiment, the anomaly detection unit 104 outputs a judgment result that an anomaly is present to the output unit 105 and does not output a judgment result that the data is normal. However, the present disclosure is not limited to this. Here, the anomaly detection unit 104 is an example of the judging unit.

Furthermore, the anomaly detection 104 may directly refer to the storage unit 106 without inquiring of the managing unit 103 about the transmission state of each data obtained from the obtaining unit 101. In this case, the anomaly detection unit 104 may obtain a transmission state by referring to the obtained data ID and the relationship between the data ID and the transmission state stored in the storage unit 106.

The output unit 105 outputs the judgment result obtained from the anomaly detection unit 104 to outside of the monitoring apparatus 100. The output unit 105 outputs the judgment result to, for example, an informing apparatus and a control apparatus that controls and manages an information processor 20 that is a transmission source of data having the data ID subjected to the judgment result. The informing apparatus and the control apparatus are provided in a vehicle and not illustrated in the drawings. Examples of the informing apparatus include a display, a loudspeaker, a warning light, and a warning buzzer. Examples of the display include a liquid crystal panel, and an organic or inorganic EL (Electroluminescence) panel. The informing apparatus informs a user of a judgment result. When the judgment result is anomalous, a control apparatus may stop information processor 20, for example, by intercepting a power supply etc., or may cause a vehicle to stop, etc.

Each of the above-described structural components, such as the obtaining unit 101, the transmission state monitoring unit 102, the anomaly detection unit 104, and output unit 105 in the monitoring apparatus 100 may be configured by a computer system (not illustrated) which includes, for example, a processor such as a central processing unit (CPU), a digital signal processor (DSP), etc. and a memory such as a random access memory (RAM), a read-only memory (ROM), etc. Part or all of the functions of each of the structural components may be achieved by a CPU or a DSP executing a program recorded on a ROM using a RAM as a working memory. In addition, part or all of the functions of each of the structural components may be achieved by a dedicated hardware circuit such as an electronic circuit, an integrated circuit, etc. Part or all of the functions of each of the structural components may be achieved by a combination of the above-described software functions and hardware circuit. The program may be provided, as an application, through communications via a communication network such as the Internet, communications according to a mobile communication standard, other wireless network, wired network, broadcast, etc.

[1-2. Operations of Monitoring Apparatus]

Figure 7:
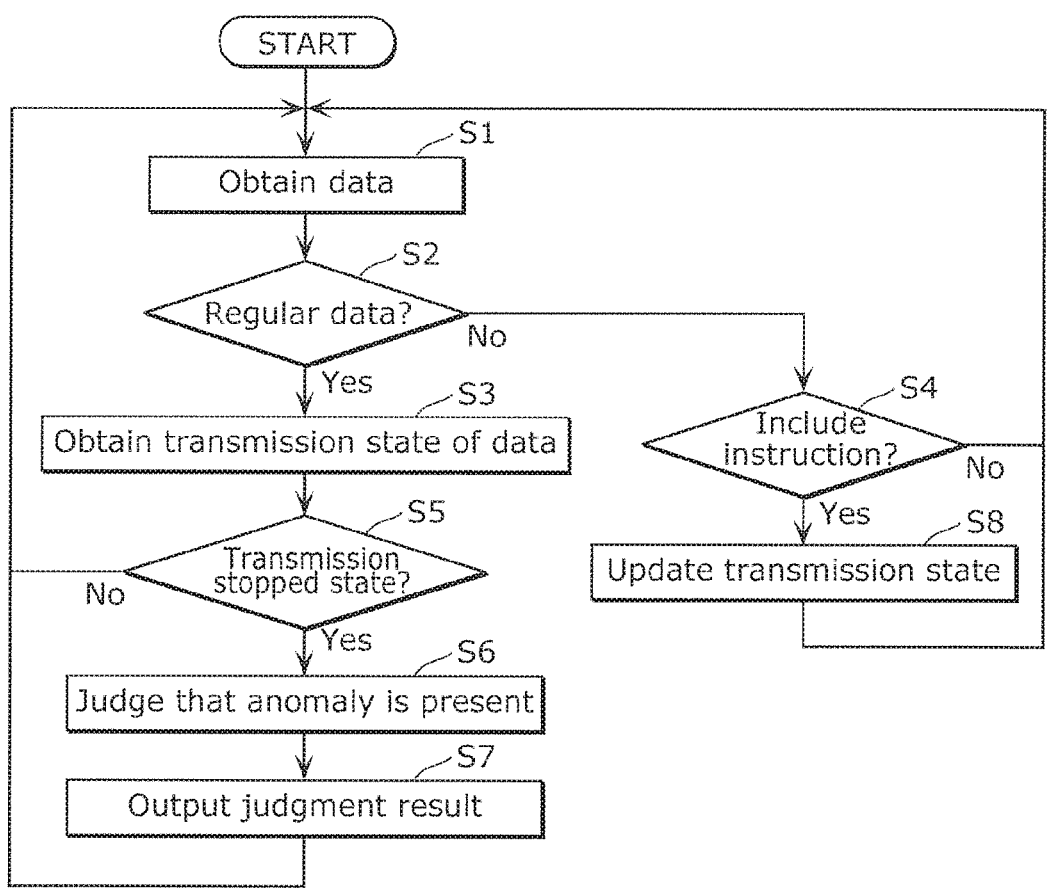
FIG. 7 is a flowchart illustrating an example of a procedure of operations of the monitoring apparatus according to Embodiment 1.

The following describes operations of the monitoring apparatus 100 according to Embodiment 1. FIG. 7 is a flowchart of an example of the process of the operations of monitoring apparatus 100 according to Embodiment 1. As illustrated in FIG. 7, in Step S1, obtaining unit 101 obtains data outputted to the network 10 from each information processor 20 from the network 10.

Next, in Step S2, the obtaining unit 101 judges that the obtained data is regular data other than the instruction data, based on the data ID of the data. Note that the relationship among the data IDs, the regular data, and the instruction data are associated with one another in advance. Thus, the obtaining unit 101 can judge whether the data having the data ID is either regular data or instruction data, by identifying the data ID. When the data is regular data (Yes in Step S2), the obtaining unit 101 outputs its data ID to the anomaly detection unit 104, and proceeds to Step S3. When the data is instruction data (No in Step S2), the obtaining unit 101 outputs the instruction data to the transmission state monitoring unit 102, and proceeds to Step S4.

In Step S3, the anomaly detection unit 104 inquires of the transmission state managing unit 103 about the data ID of the obtained data, and obtains the transmission state of the data ID. The transmission state managing unit 103 obtains the transmission state associated with the obtained data ID by referring to the inquired data ID and the relationships between the data ID and the transmission states stored in the storage unit 106. Subsequently, the transmission state managing unit 103 outputs the obtained transmission state to the anomaly detection unit 104. Next, in Step S5, the anomaly detection unit 104 determines whether the data ID inquired in Step S3 is associated with the transmission stopped state. When the data ID is associated with the transmission stopped state (Yes in Step S5), the anomaly detection unit 104 proceeds to Step S6. When the data ID is associated with the transmission execution state (No in Step S5), the anomaly detection unit 104 returns to Step S1.

In Step S6, the anomaly detection unit 104 judges that an anomaly is present in the obtained data. The data obtained in Step S1 is data whose data ID is in the transmission stopped state. Thus, the data can be judged to be anomalous data. The anomaly detection unit 104 outputs the judgment result, that is, an anomaly is present, to the output unit 105. Next, in Step S7, the output unit 105 outputs the judgment result to the outside of the monitoring apparatus 100, and returns to Step S1.

In Step S4, the transmission state monitoring unit 102 checks the contents of the payload of the obtained instruction data, and judge whether the contents include an instruction to stop or restart the transmission. When such instruction is included (Yes in Step S4), the transmission state monitoring unit 102 determines that the transmission state of the information processor 20 subjected to the instruction data is the transmission stopped state or the transmission execution state. The transmission state monitoring unit 102 outputs, to the transmission stopped state managing unit 103, i) information about the transmission stopped state or transmission execution state that is determined, and ii) the data ID of the instruction data instructing the above transmission stopped state or transmission execution state determined. The process then proceeds to Step S8. When no instruction for stopping or restarting transmission is included (No in Step S4), the transmission state monitoring unit 102 returns to Step S1.

In Step S8, the transmission state managing unit 103 updates the transmission state of the data ID. Specifically, when the transmission state managing unit 103 obtains the information indicating the transmission stopped state, the transmission state managing unit 103 changes some of the transmission states stored in the storage unit 106 to the transmission stopped state. The transmission states to be changed are the transmission states associated with the data IDs of data whose transmission source is the information processor 20 that is the destination of the instruction data having the data IDs obtained together with the information indicating the transmission stopped state. When the transmission state managing unit 103 obtains the information indicating the transmission execution state, the transmission state managing unit 103 changes all the transmission states that are stored in the storage unit 106 and that are associated with data IDs of the data whose transmission source is the information processor 20 that is the destination of the instruction data having the data ID obtained together with the information indicating the transmission execution state, to the transmission execution state. After the transmission state is changed, the transmission state managing unit 103 returns to Step S1.

[1-3. Effects, Etc.]

As described above, the monitoring apparatus 100 according to Embodiment 1 monitors the data transmitted via the network 10 in mobility. The monitoring apparatus 100 includes: an obtaining unit 101 configured to obtain data transmitted between information processors 20 communicatively coupled to a network 10; transmission state monitoring unit 102 and a transmission state managing unit 103, which are a determination unit, configured to determine, based on the data obtained by the obtaining unit 101, the transmission state of the data; and an anomaly detection unit 104, which is a judging unit, configured to judge presence or absence of an anomaly in the data obtained by the obtaining unit 101, based on a transmission state determined by the transmission state monitoring unit 102 and the transmission state managing unit 103. The anomaly detection unit 104 is configured to judge that an anomaly is present in the data, when the transmission state of the data is a transmission stopped state.

With the above configuration, the monitoring apparatus 100 determines a transmission state associated with the data based on the data transmitted in the network 10. When the data whose transmission state is a transmission stopped state is obtained, the monitoring apparatus 100 judges that an anomaly is present in the data. Such a monitoring apparatus 100 can detect an anomaly in data, not only when the data is forged with change in the output cycle, but also when the data is forged without changing the output cycle. For example, the monitoring apparatus 100 can also detect an anomaly in data under either a camouflage data attack while authorized data coexists or a camouflage data attack while authorized data is suppressed. Therefore, the monitoring apparatus 100 makes it possible to improve the detection accuracy of the anomaly of the data in the network 10.

Furthermore, in the monitoring apparatus 100 according to Embodiment 1, the transmission state monitoring unit 102 and the transmission state managing unit 103 may determine, based on first data obtained by the obtaining unit 101, a transmission state of second data whose transmission source is a first information processor 20 that is a destination of the first data. Furthermore, the anomaly detection unit 104 may judge that an anomaly is present in second data, when the transmission state of the second data obtained by the obtaining unit 101 is the transmission stopped state. According to the above configuration, the monitoring apparatus 100 determines that the transmission state of the data transmitted from the first information processor 20 is determined based on the first data transmitted to the first information processor 20. In other words, the monitoring apparatus 100 manages a transmission state of data for each information processor 20. Thus, the monitoring apparatus 100 enables highly accurate and simple detection of an anomaly in data in the network 10.

Furthermore, in the monitoring apparatus 100 according to Embodiment 1, the first data may include an instruction instructing the first information processor 20 to execute or stop transmission of data. Moreover, the transmission state monitoring unit 102 and the transmission managing unit 103 may determine the transmission execution state or the transmission stopped state of second data in accordance with an instruction of the first data. According to the above configuration, the monitoring apparatus 100 determines that the transmission state of the data transmitted from the first information processor 20 in accordance with the instruction included in the first data. Therefore, the process of determining a transmission state can be simplified.

The monitoring apparatus 100 according to Embodiment 1 may further includes: a storage unit 106 configured to store, in association with one another, i) an information processor 20 communicatively coupled to the network, ii) data whose transmission source is the information processor 20, and iii) the transmission state of the data whose transmission source is the information processor 20. The transmission state managing unit 103 may change the transmission state stored in the storage unit 106 using the transmission state determined by the transmission state monitoring unit 102. The anomaly detection unit 104 is configured to perform judgment based on the transmission state stored in the storage unit 106. According to the above configuration, the transmission state of data is held in the storage unit 106. Since the anomaly detection unit 104 performs judgment using the transmission state held in the storage unit 106, the processing by the anomaly detection unit 104 can be simplified.

Embodiment 2

The following describes a monitoring apparatus 200 according to Embodiment 2. The monitoring apparatus 200 according to Embodiment 2 differs from Embodiment 1 in that the transmission state of data is determined based on the output cycle of the data. The monitoring apparatus 200 according to Embodiment 2 manages a transmission state for each data ID, without associating data with information processors 20. The following mainly describes points different from Embodiment 1, and points similar to Embodiment 1 are omitted.

[2-1. Configuration of Monitoring Apparatus]

Figure 8:
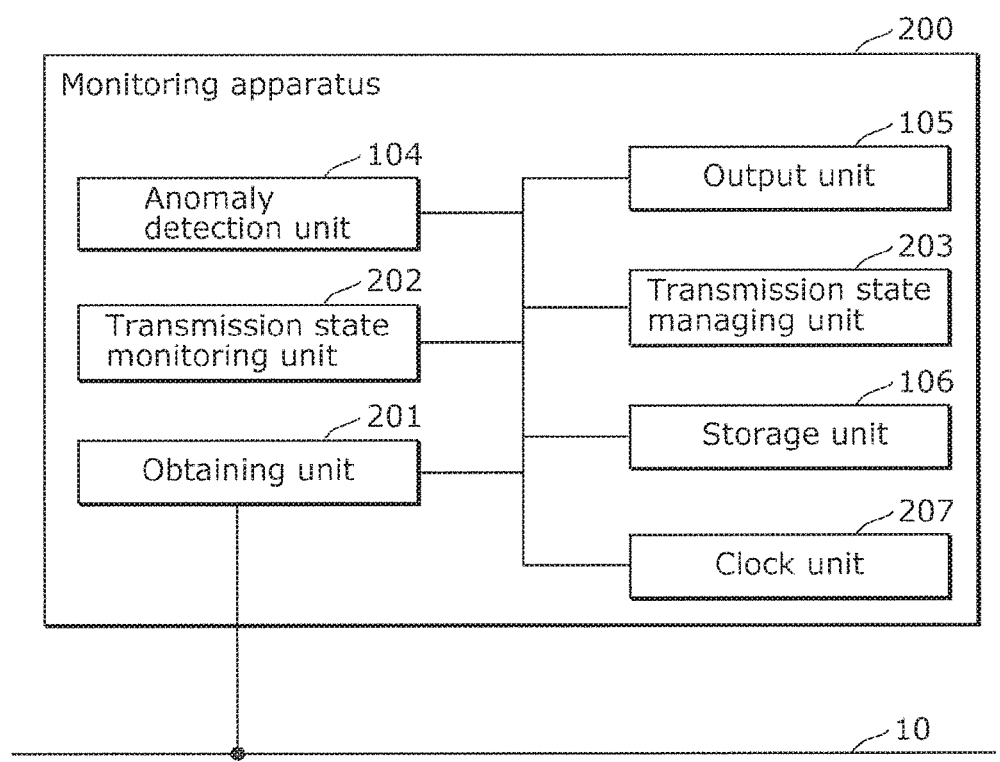
FIG. 8 is a block diagram illustrating an example of a functional configuration of a monitoring apparatus according to Embodiment 2.

FIG. 8 is a block diagram illustrating one example of the functional configuration of the monitoring apparatus 200 according to Embodiment 2. As illustrated in FIG. 8, the monitoring apparatus 200 includes an obtaining unit 201, a transmission state monitoring unit 202, a transmission state managing unit 203, the anomaly detection unit 104, the output unit 105, the storage unit 106, and a clock unit 207. Since the configurations of the anomaly detection unit 104, the output unit 105, and the storage unit 106 are the same as those in Embodiment 1, the detailed description is omitted.

The clock unit 207 includes an apparatus that measures elapsed time, such as a timer or a clock. The clock unit 207 measures, for each data ID, a time elapsed from a time at which data having an associated data ID is obtained by the obtaining unit 201. The clock unit 207 outputs, to the transmission state monitoring unit 202, the measurement result associated with the data ID. During the measurement, when new data having the data ID is obtained, the clock unit 207 resets the elapsed time to zero, and starts new measurement. Furthermore, the elapsed time in which data having the associated ID cannot be obtained reaches a predetermined period with respect to each data ID, the clock unit 207 detects the state as a timeout state. The clock unit 207 outputs the measurement result to the transmission state monitoring unit 202, in association with the data ID and the information indicating the timeout state.

The obtaining unit 201 obtains, from the network 10, data outputted from each information processor 20 to the network 10, and outputs the data to the transmission state monitoring unit 202, and the anomaly detection unit 104, and the clock unit 207. The obtaining unit 201 outputs both of the instruction data and the regular data to the transmission state monitoring unit 202, the anomaly detection unit 104, and the clock unit 207.

Transmission state monitoring unit 202 determines, for each data ID that is obtainable by the obtaining unit 201, a transmission state associated with the data ID obtained by the obtaining unit 201 based on an elapsed time corresponding to the data ID measured by the clock unit 207. Specifically, the transmission state monitoring unit 202 monitors, for each data ID, whether data having an associated data ID is periodically outputted to the network 10 from the information processor 20. Note that the information processor 20 outputs the data having the data ID assigned to the data in a predetermined cycle. The transmission state monitoring unit 202 determines that the transmission state corresponding to the data ID is a transmission stopped state, when the data having the data ID is not obtained for equal to or more than a predetermined period, specifically, when the information indicating the data ID is in a timeout state is obtained from the clock unit 207. When the data having the data ID is obtained in a period less than the predetermined period, specifically, when the data having the data ID is obtained from the clock unit 207 without information indicating that the data having the data ID is in a timeout state, the transmission state monitoring unit 202 determines that the transmission state associated with the data ID is a transmission execution state. The transmission state monitoring unit 202 outputs, to the transmission state managing unit 203, the determined transmission state and a data ID which is subjected to the determined transmission state.

The predetermined period is a period longer than an output cycle of an information processor 20 outputting data having the data ID. An output cycle is set for each data ID. For example, the predetermined period may be an N cycle (N≥2). When N=10 and the output cycle is 40 ms, the predetermined period is 400 ms.

The transmission state managing unit 203 manages the transmission state of data for each data ID. The transmission state managing unit 203 updates the transmission state of the data ID stored in the storage unit 106 based on the transmission state of the data ID transmitted from the transmission state monitoring unit 202. In the present embodiment, as shown in FIG. 9, each data ID is associated with a transmission state corresponding to the data ID, and stored in the storage unit 106. FIG. 9 is a table illustrating one example of the relationships between data IDs and transmission states according to Embodiment 2. When the transmission state managing unit 203 obtains a transmission state and a data ID from the transmission state monitoring unit 202, the transmission state managing unit 203 changes the transmission state associated with the data ID to the obtained transmission state. Furthermore, when the transmission state managing unit 203 receives an inquiry about a transmission state of a data ID from the anomaly detection unit 104, the transmission state managing unit 203 obtains the transmission state associated with the data ID by referring to the storage unit 106, and outputs the transmission state associated with the data ID to the anomaly detection unit 104.

The anomaly detection unit 104 inquires of the transmission state managing unit 203 about a transmission state associated with a data ID with respect to each data obtained from the obtaining unit 201. Then, the anomaly detection unit 104 judges presence or absence of an anomaly in the data having the data ID, based on the transmission state obtained from the transmission state managing unit 203. When the transmission state associated with the obtained data ID is the transmission stopped state, the anomaly detection unit 104 judges that an anomaly is present in the data having the obtained data ID. When the transmission state associated with the obtained data ID is the transmission execution state, the anomaly detection unit 104 judges that the data having the data ID is normal. Note that the anomaly detection unit 104 may directly obtain the transmission state for a data ID from the storage unit 106 without inquiring of the transmission managing unit 203 about the transmission state of each data obtained from the obtaining unit 201.

[2-2. Operations of Monitoring Apparatus]

Figure 10:
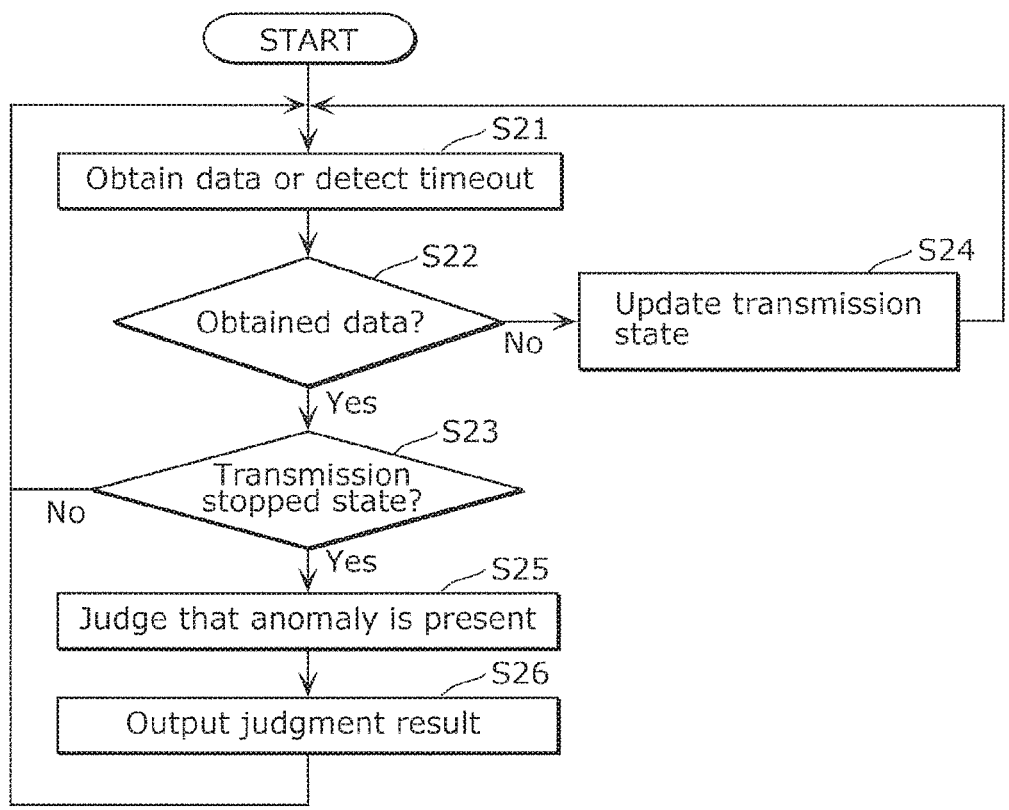
FIG. 10 is a flowchart illustrating an example of a procedure of operations of the monitoring apparatus according to Embodiment 2.

The following describes operations of the monitoring apparatus 200 according to Embodiment 2. FIG. 10 is a flowchart of one example of the process of the operations of monitoring apparatus 200 according to Embodiment 2. Note that FIG. 10 shows the operations of the monitoring apparatus 200 for data outputted from one information processor 20.

As shown in FIG. 10, in Step S21, the obtaining unit 201 or the clock unit 207 obtains data from the information processor 20 or detects a timeout state, and the detected result is outputted to the transmission state monitoring unit 202. Specifically, when the obtaining unit 201 obtains, from the network 10, data outputted from the information processor 20 to the network 10, the obtained data is transmitted to the transmission state managing unit 202. Accordingly, the data ID of the obtained data is also outputted to the transmission state monitoring unit 202. Alternatively, when the timeout state of the data having the data ID which is supposed to be cyclically outputted from the information processor 20 to the network 10 is detected, the clock unit 207 associates the data ID with the information indicating the timeout state and outputs it to the transmission state monitoring unit 202.

Next, in Step S22, the transmission state monitoring unit 202 judges whether the data ID matches the data ID of the obtained data. When the data ID is associated with the obtained data (Yes in Step S22), the transmission state monitoring unit 202 proceeds to Step S23. When the data ID is not associated with the obtained data, i.e., the data ID is associated with the timeout state (No in Step S22), the transmission state monitoring unit 202 determines that the transmission state of the data ID is the transmission stopped state. Furthermore, the transmission state monitoring unit 202 outputs, to the transmission state managing unit 203, i) information indicating the transmission stopped state, and ii) an data ID subjected to the transmission stopped state. The transmission state monitoring unit 202 then proceeds to Step S24.

In Step S24, the transmission state managing unit 203 updates the transmission state associated with the data ID. Specifically, the transmission state managing unit 203 changes the transmission state that is stored in the storage unit 106 and that is associated with the data ID subjected to the obtained information indicating the transmission stopped state, to the transmission stopped state. Subsequently, the transmission state managing unit 203 returns to Step S21.

In Step S23, the anomaly detection unit 104 judges whether the data having the data ID obtained in Step S22 is in the transmission stopped state. When the data having the data ID is in the transmission stopped state (Yes in Step S23), the anomaly detection unit 104 proceeds to Step S25. When the data having the data ID is in the transmission execution state (No in Step S23), the anomaly detection unit 104 returns to Step S21.

In Step S25, the anomaly detection unit 104 judges that an anomaly is present in the data having the obtained data ID. The anomaly detection unit 104 outputs the judgment result indicating an anomaly is present in the data to the output unit 105. Next, in Step S26, the output unit 105 outputs the judgment result to the outside of the monitoring apparatus 200, and returns to Step S21.

[2-3. Effects, Etc.]

Since the other configurations and operations of the monitoring apparatus 200 according to Embodiment 2 are the same as those of Embodiment 1, the description thereof is omitted. With the monitoring apparatus 200 according to Embodiment 2, similar effects as in Embodiment 1 can be obtained.

Furthermore, in the monitoring apparatus 200 according to Embodiment 2, the obtaining unit 201 obtains third data cyclically outputted by an information processor 20 communicatively coupled to the network. When the third data is not obtained by the obtaining unit 201 for a predetermined period, the transmission state monitoring unit 202 may determine that a transmission state of the third data is the transmission stopped state. When the transmission state of the third data obtained by the obtaining unit 201 is the transmission stopped state, the anomaly detection unit 104 may judge that an anomaly is present in the third data.

With the above configuration, when the third data is not obtained by the obtaining unit 201 for a predetermined period, the third data can be considered as being in the transmission stopped state. The monitoring apparatus 200 judges that an anomaly is present in the third data, when such third data whose transmission state is the transmission stopped state is obtained. The monitoring apparatus 200 can detect an anomaly in data, not only when the data is forged with change in the output cycle, but also when the data is forged without change in the output cycle.

Furthermore, the monitoring apparatus 200 according to Embodiment 2 may further includes: a storage unit 106 that stores, in association with one another, i) the data transmitted between a plurality of information processors 20 communicatively coupled to the network and ii) the transmission state of the data transmitted between the information processors 20. The transmission state managing unit 203 may change the transmission state stored in the storage unit 106 using the transmission state determined by the transmission monitoring unit 202. The anomaly detection unit 104 may perform judgment based on the transmission state stored in the storage unit 106. With the above configuration, the transmission state associated with data is held in the storage unit 106. Since the anomaly detection unit 104 performs judgment using the transmission state held in the storage unit 106, the processing by the anomaly detection unit 104 can be simplified.

Embodiment 3

The following describes a monitoring apparatus 300 according to Embodiment 3. Similar to Embodiment 2, the monitoring apparatus 300 according to Embodiment 3 determines a transmission state of data based on the output cycle of the data. However, the monitoring apparatus 300 according to Embodiment 3 differs from the monitoring apparatus 200 according to Embodiment 2 in that the monitoring apparatus 300 manages a transmission state for each data ID in association with the data and each information processor 20. The following mainly describes points different from Embodiments 1 and 2, and points similar to Embodiments 1 and 2 are omitted.

Figure 11:
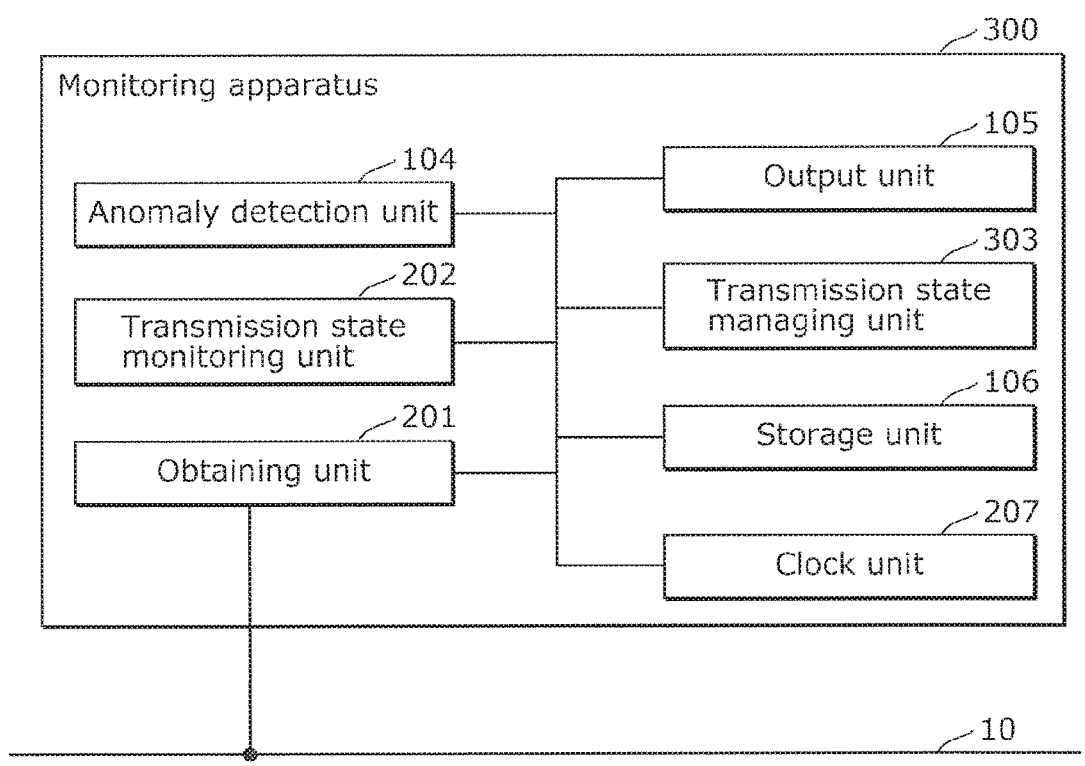
FIG. 11 is a block diagram illustrating an example of a functional configuration of a monitoring apparatus according to Embodiment 3.

FIG. 11 is a block diagram illustrating an example of the functional configuration of the monitoring apparatus 300 according to Embodiment 3. As illustrated in FIG. 11, the monitoring apparatus 300 includes the obtaining unit 201, the transmission state monitoring unit 202, a transmission state managing unit 303, the anomaly detection unit 104, the output unit 105, the storage unit 106, and the clock unit 207. Since the configurations of the obtaining unit 201, transmission state monitoring unit 202, the anomaly detection unit 104, the output unit 105, the storage unit 106, and the clock unit 207 are the same as the configurations in Embodiment 2, the detailed description is omitted.

The transmission state managing unit 303 performs processing similar to the processing of the transmission state managing unit 103 in Embodiment 1. Specifically, based on the transmission state of the data ID transmitted from the transmission state monitoring unit 202, the transmission state managing unit 303 updates the transmission state of the data ID stored in the storage unit 106. In the present embodiment, as shown in FIG. 3, the storage unit 106 stores, in association with one another, i) each data ID, ii) an ID of an information processor 20 that is a transmission source of the data, and iii) the data transmission state associated with the data ID.

When the transmission state managing unit 303 obtains, from the transmission monitoring unit 202, a transmission state and a data ID which is subjected to the obtained transmission state, the transmission states of all the data whose transmission source is the information processor 20 which is the transmission source of the data having the obtained data ID are changed to the obtained transmission state. Note that in the present embodiment, the transmission state managing unit 303 changes the transmission state associated with the data ID, when the obtained transmission state is the transmission stopped state. When the obtained transmission state is the transmission execution state, the transmission state managing unit 303 maintains the transmission state associated with the data ID as it is, and does not change the transmission state. However, the present disclosure is not limited to this. The transmission state associated with the data ID may be changed also in the latter case.

The anomaly detection unit 104 inquires of the transmission state managing unit 303 about the transmission state associated with the data ID of the data obtained from the obtaining unit 201, and judges presence or absence of an anomaly in the data having the data ID based on the transmission state obtained from the transmission state managing unit 303. Note that the anomaly detection unit 104 may directly obtain the transmission state associated with a data ID from the storage unit 105 without inquiring of the managing unit 303 about the transmission state associated with the data ID.

Since the other configurations and operations of the monitoring apparatus 300 according to Embodiment 3 are the same as those of Embodiment 1 or 2, the descriptions thereof are omitted. With the monitoring apparatus 300 according to Embodiment 3, similar effects as in Embodiment 2 can be obtained. Furthermore, in the monitoring apparatus 300 according to Embodiment 3, when data is not obtained by the obtaining unit 201 for a predetermined period, the transmission state monitoring unit 202 and the transmission state managing unit 303 may determine that a transmission state of fourth data is the transmission stopped state, the fourth data being other data whose transmission source is the information processor 20 associated with the data that is not obtained for the predetermined period. When the transmission state of the fourth data obtained by the obtaining unit 201 is the transmission stopped state, the anomaly detection unit 104 may judge that an anomaly is present in the fourth data. According to the above aspect, the electronic control apparatus 300 determines a transmission state of data that is possibly outputted by the information processor 20, based on the third data transmitted by the information processor 20. The monitoring apparatus 300 manages the transmission states of data for each information processor 20. Thus, the monitoring apparatus 300 can perform highly accurate and simple detection of an anomaly in data in the network 10.

Embodiment 4

The following describes a monitoring apparatus 400 according to Embodiment 4. The monitoring apparatus 400 according to Embodiment 4 differs from Embodiments 1 to 3 in that the transmission state of data is determined based on the contents of instruction in the instruction data and the output cycle of the data. The monitoring apparatus 400 according to Embodiment 4 manages a transmission state for each data ID in association with the data and each information processor 20. The following mainly describes points different from Embodiments 1 to 3, and points similar to Embodiments 1 to 3 are omitted.

Figure 12:
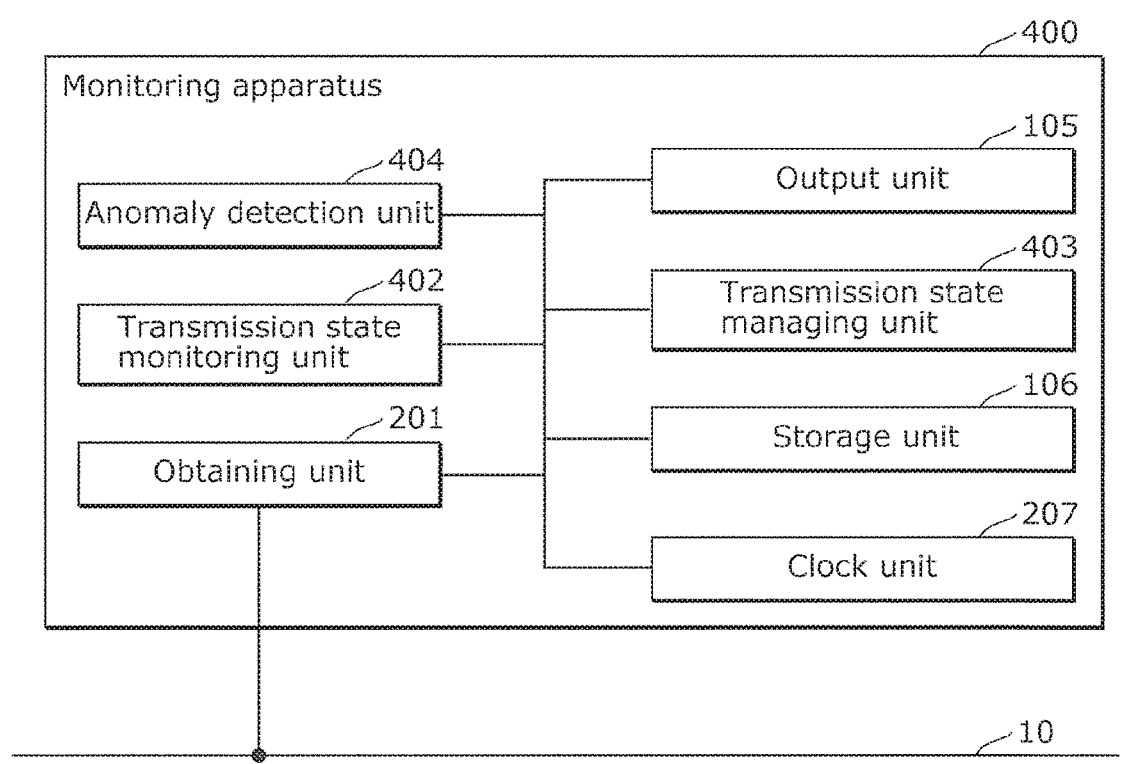
FIG. 12 is a block diagram illustrating an example of a functional configuration of a monitoring apparatus according to Embodiment 4.

FIG. 12 is a block diagram illustrating an example of the functional configuration of the monitoring apparatus 400 according to Embodiment 4. As illustrated in FIG. 12, the monitoring apparatus 400 includes the obtaining unit 201, a transmission state monitoring unit 402, a transmission state managing unit 403, an anomaly detection unit 404, the output unit 105, the storage unit 106, and the clock unit 207. Since the configurations of the obtaining unit 201, output unit 105, the storage unit 106 and the clock unit 207 are the same as the configurations in Embodiment 2, the detailed description is omitted.

The obtaining unit 201 obtains, from the network 10, both instruction data and regular data outputted from each information processor 20 to the network 10, and outputs the data to the transmission state monitoring unit 402, the anomaly detection unit 404, and the clock unit 207.

Similar to Embodiment 3, the transmission state monitoring unit 402 determines, for each data ID that is obtainable by the obtaining unit 201, a transmission state associated with the data ID based on an elapsed time corresponding to the data ID measured by the clock unit 207. The transmission state monitoring unit 402 determines that the transmission state associated with the data ID is the transmission stopped state, when the data having the data ID is not obtained for equal to or more than a predetermined period, specifically, when the information indicating its data ID is in a timeout state is obtained from the clock unit 207. Moreover, the transmission state monitoring unit 202 determines the transmission state associated with the data ID to be the transmission execution state, when the data having data ID is obtained in a period less than the predetermined period. In the following, the contents of the decision that has been made by the transmission state monitoring unit 402 based on such a predetermined period is called a "first decision".

Furthermore, similar to Embodiment 1, when the transmission state monitoring unit 402 obtains instruction data from the obtaining unit 201, the transmission state monitoring unit 402 determines the transmission state of the information processor 20 that is the destination of the instruction data, in accordance with the instruction included in the instruction data. In the following, the content of the decision that has been made by the transmission state monitoring unit 402 based on such instruction data is called a "second decision". The transmission state monitoring unit 402 outputs, in association with one another, i) the first decision or the second decision, and ii) a data ID subjected to the determined decision, to the transmission state managing unit 403.

When the transmission state managing unit 403 obtains the first decision, the transmission state managing unit 403 performs similar processing performed by the transmission state managing unit 303 in Embodiment 3. When the transmission state managing unit 403 obtains the second decision, the transmission state managing unit 403 performs similar processing performed by the transmission state managing unit 103 in Embodiment 1. Note that the storage unit 106 stores, in association with one another, i) each data ID, ii) an ID of an information processor 20 that is a transmission source of the data having the data ID, and iii) the data transmission state associated with the data ID, as shown in FIG. 3, for example.

Specifically, the transmission state managing unit 403 updates the transmission state stored in the storage unit 106 based on the transmission state included in the obtained decision in both cases where the first decision is obtained and where the second decision is obtained. Specifically, when the transmission state managing unit 403 obtains the first decision including the transmission execution state, the transmission state managing unit 403 maintains, as they are, the transmission states associated with the all data IDs of data whose transmission source is the information processor 20 that is the transmission source of the data ID subjected to the first decision. When the transmission state managing unit 403 obtains the first decision including the transmission stopped state, the transmission state managing unit 403 changes the transmission states to the transmission stopped states for the all data IDs of data whose transmission source is the information processor 20 that is the transmission source of the data having the data ID subjected to the first decision.

Furthermore, when the transmission state managing unit 403 obtains the second decision including the transmission stopped state, the transmission state managing unit 403 changes the transmission states to the transmission stopped states for the all data IDs of data whose transmission source is the information processor 20 that is a destination of the instruction data having the data ID subjected to the second decision. Furthermore, when the transmission state managing unit 403 obtains the second decision including the transmission execution state, the transmission state managing unit 403 changes the transmission states to the transmission execution states for the all data IDs of data whose transmission source is the information processor 20 that is a destination of the instruction data having the data ID subjected to the second decision.

The anomaly detection unit 404 inquires of the transmission state managing unit 403 about a transmission state associated with the data ID for each of the data obtained from the obtaining unit 201, and judges presence or absence of an anomaly in the data having the data ID based on the transmission state obtained from the transmission state managing unit 403. Here, the transmission state managing unit 403 that has received the inquiry about the data ID obtains the transmission state associated with the data ID by referring to the relationships stored in storage unit 106, for example, the relationships shown in FIG. 3. Subsequently, the transmission state managing unit 403 outputs the transmission state to the anomaly detection unit 404. Note that the anomaly detection unit 404 may directly obtain the transmission state associated with a data ID from the storage unit 106 without inquiring of the managing unit 403 about the transmission state.

Since the other configurations and operations of the monitoring apparatus 400 according to Embodiment 4 are the same as that of Embodiments 1 to 3, the description thereof is omitted. With the monitoring apparatus 400 according to Embodiment 4, similar effects as in Embodiments 1 and 3 can be obtained.

Furthermore, in the monitoring apparatus 400 according to Embodiment 4, when data is not obtained by the obtaining unit 201 for a predetermined period, the transmission state monitoring unit 402 and the transmission state managing unit 403 may determine that a transmission state of fourth data is the transmission stopped state, the fourth data being data whose transmission source is the information processor 20 associated with the data that is not obtained for the predetermined period. Moreover, when the transmission state of the fourth data obtained by the obtaining unit 201 is the transmission stopped state, the anomaly detection unit 404 may judge that an anomaly is present in the fourth data. Moreover, the transmission state monitoring unit 402 and the transmission state managing unit 403 may determine that the transmission state of sixth data whose transmission source is an information processor 20 is a transmission execution state or the transmission stopped state in accordance with an instruction included in fifth data which is obtained by the obtaining unit 201 and whose destination is the above information processor 20. Note that the fifth data may include the instruction instructing the information processor 20 to execute or stop transmission of data. When the transmission state of the sixth data is obtained by the obtaining unit 201 and the transmission state of the sixth data is the transmission stopped state, the anomaly detection unit 404 may judge that an anomaly is present in the sixth data.

With the above configuration, the monitoring apparatus 400 determines that data is in the transmission stopped state in both cases where the data is not obtained by the obtaining unit 201 for a predetermined period and where the data including an instruction for stopping transmission is obtained. The monitoring apparatus 400 then judges presence or absence of an anomaly in the data obtained by the obtaining unit 201 based on the transmission stopped state determined in the above manner. Thus, the monitoring apparatus 400 makes it possible to improve the detection accuracy of an anomaly in data.

Other Variations

Although the monitoring apparatus, etc. according to one or more aspects of the present disclosure have been described based on the embodiments, the present disclosure is not limited to the above embodiments. Other forms in which various modifications apparent to those skilled in the art are applied to the embodiments and variations, or forms structured by combining structural components of different embodiments and variations may be included within the scope of one or more aspects of the present disclosure, unless such changes and variations depart from the scope of the present disclosure.

For example, in the monitoring apparatus according to the embodiments, the network 10 to which the monitoring apparatus is communicatively coupled includes one bus, and a plurality of information processors 20 are connected to the bus. However, the present disclosure is not limited to this configuration. The network to which the monitoring apparatus is communicatively coupled may be a bus network including a plurality of buses. In this case, one monitoring apparatus may be communicatively connected to a plurality of buses and may monitor the plurality of buses collectively. The obtaining unit of the monitoring apparatus may obtain data from the plurality of buses. With such a configuration, the number of monitoring apparatuses can be reduced, and thus the cost can also be reduced.

Alternatively, a plurality of monitoring apparatuses may be provided for a plurality of buses, and the obtaining unit in each of the monitoring apparatuses may obtain data from a corresponding one of the buses. For example, when the plurality of buses are communicatively coupled to one another via a relay apparatus such as a gateway, providing one monitoring apparatus for each bus enables the monitoring apparatus to monitor the bus while interference with processing of the relay apparatus is suppressed. In other words, this allows reliable monitoring of each bus.

The monitoring apparatus according to one or more embodiments above determines that data is in the transmission stopped state when instruction to stop transmission of data is included in instruction data, and when data is not obtained for a predetermined period. However, the present disclosure is not limited to this example. For example, when a power supply of an information processor 20 communicatively coupled to the network is in an ON state, the transmission state monitoring unit of the monitoring apparatus may determine that data whose transmission source is the information processor 20 is in a transmission execution state, and when the power supply of the information processor 20 is in an OFF state, the transmission state monitoring unit may determine that the data whose transmission source is the information processor 20 is in the transmission stopped state. With the above configuration, the number of cases where the transmission state is correctly determined to be the transmission stopped state increases, and thus the monitoring apparatus can improve the detection accuracy of an anomaly in data. For example, when the network to which the monitoring apparatus is communicatively coupled is an in-vehicle network, the above information processor 20 may operate by an ignition switch of a vehicle. Such a monitoring apparatus may determine the transmission state of information processor 20 to be the transmission stopped state or the transmission execution state, when the change of the ignition switch is detected, such as when the ignition switch is switched from an ON state to an OFF state, or switched from the OFF state to an ON state.

Moreover, the monitoring apparatus according to one or more embodiments above is not limited to the configuration in which the monitoring apparatus is communicatively coupled to a network as a dedicated monitoring apparatus. The monitoring apparatus may be mounted as an extra feature in the information processor that has already been installed in the network, or in a relay apparatus such as a gateway. When the monitoring apparatus is mounted in a relay apparatus, the relay apparatus may be configured such that the monitoring apparatus stops transferring a data ID for which an anomaly is detected. This prevents anomalous data from spreading to other networks communicatively coupled to the relay apparatus.

Figure 13:
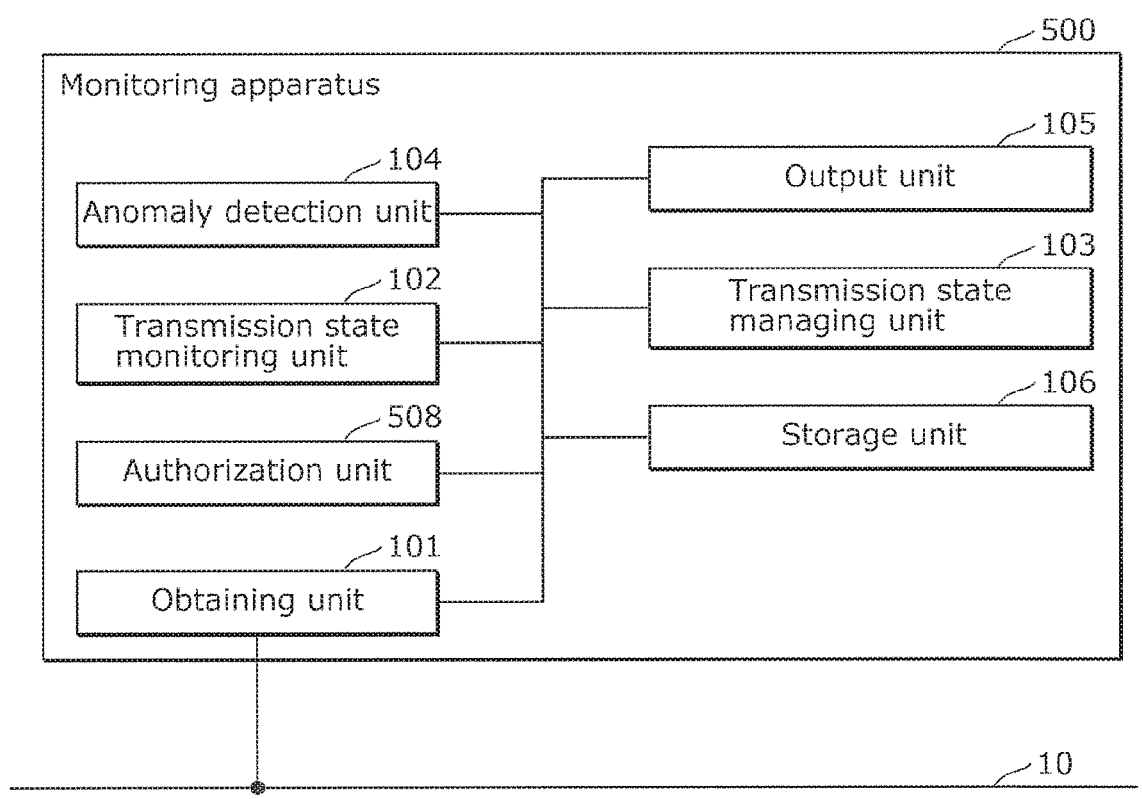
FIG. 13 is a block diagram illustrating an example of a functional configuration of a monitoring apparatus according to a variation of Embodiment 1.

Moreover, the monitoring apparatus according to one or more embodiments above may also include an authentication unit that authenticates validity of data itself, as illustrated in FIG. 13. The monitoring apparatus may determine the transmission state using obtained data, only when the validity of the obtained data is confirmed. Note that FIG. 13 is a block diagram illustrating an example of the functional configuration of a monitoring apparatus 500 according to a variation of Embodiment 1. In the present variation, an authentication unit 508 in the monitoring apparatus 500 authenticates the validity of instruction data. In this case, instruction data includes an authorization code, such as a message authentication code (MAC). The authentication unit 508 authenticates the validity of instruction data by verifying an authorization code of instruction data. The transmission state monitoring unit 102 determines the transmission state of data subjected to the instruction data, in accordance with the instruction of transmission state included in valid instruction data, and does not follow an instruction of transmission state included in invalid instruction data. Note that the authentication result of the authentication unit 508 does not need to be used by the transmission state monitoring unit 102, and may be used by the anomaly detection unit 104 in judging an anomaly. As in Embodiments 2 to 4, when a transmission stopped state is determined based on an interval between obtaining data, the transmission state monitoring unit may determine the transmission stopped state based on only an interval between obtaining valid data.

Although the monitoring apparatus according to one or more embodiments above manages the transmission state of each data ID using the relationship in which each data ID stored in the storage unit 106 is associated with its transmission state. However, the present disclosure is not limited to this configuration. For example, the monitoring apparatus may manage the transmission state of each data using the relationship in which data content and its transmission state are associated with one another.

Moreover, the monitoring apparatus according to one or more embodiments above is communicatively coupled to a bus network such as CAN, but the present disclosure is not limited to this. The monitoring apparatus may be communicatively coupled to a network of other standards, such as Ethernet (registered trademark), Media Oriented System Transport (MOST), Local Interconnect Network (LIN), and FlexRay, and monitor the network that is communicatively coupled.

As described above, the technique according to the present disclosure may be implemented using a system, an apparatus, a method, an integrated circuit, a computer program, or a computer-readable recording medium such as a recording disk, or any combination of systems, apparatuses, methods, integrated circuits, computer programs, or computer-readable recording media. The computer-readable recording medium includes, for example, a non-volatile recording medium such as a compact disc-read only memory (CD-ROM).

For example, each of the processing units included in the foregoing embodiments and variations are typically implemented as a large scale integration (LSI) which is an integrated circuit. These processing units may be individually configured as single chips, or may be configured so that part or all of the processing units are included in a single chip.

Moreover, the method of circuit integration is not limited to LSI. Integration may be implemented with a dedicated circuit or a general purpose processor. After the LSI circuit is manufactured, a field programmable gate array (FPGA) or a reconfigurable processor capable of reconfiguring the connections and settings of the circuit cells in the large scale integrated circuit may be used.

Note that in the above embodiments, all or some of the elements may be configured as a dedicated hardware, or may be implemented by executing a software program suitable for each structural component. Each structural component may be implemented as a result of a program execution unit of a central processing unit (CPU) or processor or the like reading and executing a software program stored on a storage medium such as a hard disk or semiconductor memory.

A portion or all of the structural components described above may each be configured as an integrated circuit (IC) card that is detachably attached to each apparatus, or as a stand-alone module. The IC card and the module are computer systems including a microprocessor, ROM, and RAM, for example. The IC card and the module may also include the LSI described above or system LSI. The IC card or the module achieves its function as a result of the microprocessor operating in accordance with a computer program. The IC card and the module may be tamperproof.

The technique according to the present disclosure may be implemented by the following monitoring method, for example. The monitoring method according to the present disclosure may be implemented by a processor such as a micro processing unit (MPU) and CPU, a circuit such as an LSI, an IC card or a stand-alone module, etc. Such a monitoring method includes: obtaining data transmitted via a network in mobility; determining, based on the data obtained, a transmission state of the data; and judging presence or absence of an anomaly in the data obtained based on the transmission state determined, and in the judging, judging that an anomaly is present in the data, when the transmission state of the data is a transmission stopped state.

In addition, the technique according to the present disclosure may be implemented by a software program or a digital signal including a software program, or a non-transitory computer-readable recording medium having a program recorded thereon. It should be understood that the above-described program can be distributed via a transmission medium such as the Internet. Such a program may cause a computer to execute: obtaining data transmitted via a network in mobility; determining, based on the data obtained, a transmission state of the data; and judging presence or absence of an anomaly in the data obtained based on the transmission state determined, and in the judging, judging that an anomaly is present in the data, when the transmission state of the data is a transmission stopped state.

Moreover, each of the numerals such as ordinal numbers and numerical quantities used in the above description is used for exemplification to specifically describe the technique of the present disclosure, and the present disclosure is not limited by the numerals used for exemplification. In addition, the relation of connection between the structural components is used for exemplification to specifically describe the technique of the present disclosure, and the relation of connection which implements the functions of the present disclosure is not limited to this.

Furthermore, the division of the functional blocks illustrated in the block diagrams has been presented as one example. Accordingly, a plurality of functional blocks may be implemented as one functional block, or one functional block may be divided into a plurality of functional blocks or a portion of the functions may be transferred to another functional block. In addition, functions of a plurality of functional blocks having similar functions may be processed by single hardware or software in parallel or in time division.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The technique according to the present disclosure is useful in monitoring a network.

The invention claimed is:

1. An electronic control apparatus, comprising:
an obtaining unit configured to obtain data transmitted via a network in a system;
a determination unit configured to determine, based on the data obtained by the obtaining unit, a transmission state of the data;
a judging unit configured to judge presence or absence of an anomaly in the data obtained by the obtaining unit, based on the transmission state of the data; and
an informing apparatus informs a user of a judgment result, wherein
the judging unit is configured to judge that an anomaly is present in the data, when the transmission state of the data is a transmission stopped state,
the determination unit is configured to determine, based on first data obtained by the obtaining unit, a transmission state of second data whose transmission source is an information processor that is a destination of the first data, and
the judging unit is configured to judge that an anomaly is present in the second data, when the transmission state of the second data obtained by the obtaining unit is the transmission stopped state.

2. The electronic control apparatus according to claim 1, wherein
the first data includes an instruction instructing the information processor to execute or stop transmission of data, and
the determination unit is configured to determine that the transmission state of the second data is a transmission execution state or the transmission stopped state in accordance with the instruction included in the first data.

3. The electronic control apparatus according to claim 1, wherein
when third data cyclically outputted by an information processor communicatively coupled to the network is not obtained for a predetermined period, the determination unit is configured to determine that a transmission state of the third data is the transmission stopped state; and
when the transmission state of the third data obtained by the obtaining unit is the transmission stopped state, the judging unit is configured to judge that an anomaly is present in the third data.

4. The electronic control apparatus according to claim 1, wherein
when third data cyclically outputted by an information processor communicatively coupled to the network is not obtained for a predetermined period, the determination unit is configured to determine that a transmission state of fourth data is the transmission stopped state, the fourth data being different from the third data whose transmission source is the information processor, and when the transmission state of the fourth data obtained by the obtaining unit is the transmission stopped state, the judging unit is configured to judge that an anomaly is present in the fourth data.

5. The electronic control apparatus according to claim 4, wherein the determination unit is configured to determine that the transmission state of the fourth data is a transmission execution state or the transmission stopped state in accordance with an instruction included in fifth data whose destination is the information processor, the fifth data includes the instruction instructing the information processor to execute or stop transmission of data, and when the transmission state of the fourth data obtained by the obtaining unit is the transmission stopped state, the judging unit is configured to judge that an anomaly is present in the fourth data.

6. The electronic control apparatus according to claim 1, further comprising:

a storage unit configured to store, in association with one another, i) an identifier of an information processor communicatively coupled to the network, ii) data whose transmission source is the information processor, and iii) the transmission state of the data whose transmission source is the information processor, wherein the determination unit is configured to change the transmission state stored in the storage unit using the transmission state determined by the determination unit, and the judging unit is configured to perform judgment based on the transmission state stored in the storage unit.

7. The electronic control apparatus according to claim 1, further comprising:

a storage unit that stores, in association with one another, i) the data transmitted between a plurality of information processors communicatively coupled to the network and ii) the transmission state of the data, wherein the determination unit is configured to change the transmission state stored in the storage unit using the transmission state determined by the determination unit, and the judging unit is configured to perform judgment based on the transmission state stored in the storage unit.

8. The electronic control apparatus according to claim 1, wherein when a power supply of an information processor communicatively coupled to the network is in an ON state, the determination unit is configured to determine that data whose transmission source is the information processor is in a transmission execution state, and when the power supply of the information processor is in an OFF state, the determination unit is configured to determine that the data whose transmission source is the information processor is in the transmission stopped state.

9. The electronic control apparatus according to claim 1, wherein when a state of an information processor is a diagnostic mode or a program updating mode, the determination unit is configured to determine that data whose transmission source is the information processor is in the transmission stopped state.

10. The electronic control apparatus according to claim 1, wherein the network is a bus network including a plurality of buses, the electronic control apparatus is provided for a plurality of buses, and the obtaining unit of the electronic control apparatus is configured to obtain data from the plurality of buses.

11. The electronic control apparatus according to claim 1, wherein the network is a bus network including a plurality of buses, a plurality of electronic control apparatuses are provided for the plurality of buses, the plurality of electronic control apparatuses each being the electronic control apparatus, and the obtaining unit in each of the plurality of the electronic control apparatuses is configured to obtain data from each of the plurality of buses.

12. A monitoring method performed by an electronic control apparatus, the monitoring method comprising:

obtaining data transmitted via a network in a system;

determining, based on the data obtained, a transmission state of the data;

judging that an anomaly is present in the data obtained, when the transmission state of the data is a transmission stopped state;

determining, based on first data obtained, a transmission state of second data whose transmission source is an information processor that is a destination of the first data;

judging that an anomaly is present in the second data, when the transmission state of the second data obtained by the obtaining unit is the transmission stopped state; and informing, via an informing apparatus, a user of a judgment result.

13. A non-transitory computer-readable recording medium for use in a computer, the non-transitory computer-readable recording medium having a computer program recorded thereon for causing the computer to execute:

obtaining data transmitted via a network in a system;

determining, based on the data obtained, a transmission state of the data;

judging that an anomaly is present in the data obtained, when the transmission state of the data is a transmission stopped state;

determining, based on first data obtained, a transmission state of second data whose transmission source is an information processor that is a destination of the first data;

judging that an anomaly is present in the second data, when the transmission state of the second data obtained by the obtaining unit is the transmission stopped state; and informing, via an informing apparatus, a user of a judgment result.

14. A gateway apparatus, comprising:

an obtaining unit configured to obtain data transmitted via a network in a system;

a determination unit configured to determine, based on the data obtained by the obtaining unit, a transmission state of the data;

a judging unit configured to judge that an anomaly is present in the data obtained by the obtaining unit, when the transmission state of the data is a transmission stopped state;

an informing apparatus configured to inform a user of a judgment result; and a transfer unit configured to stop information processor transmitted data, when the judging unit judges that the anomaly is present in the data, wherein the determination unit is configured to determine, based on first data obtained by the obtaining unit, a transmission state of second data whose transmission source is an information processor that is a destination of the first data, and the judging unit is configured to judge that an anomaly is present in the second data, when the transmission state of the second data obtained by the obtaining unit is the transmission stopped state.

* * * * *